May 28, 1963  G. F. PAPPAS ETAL  3,091,586
HYDROFINING OF SHALE OIL
Filed Dec. 15, 1959
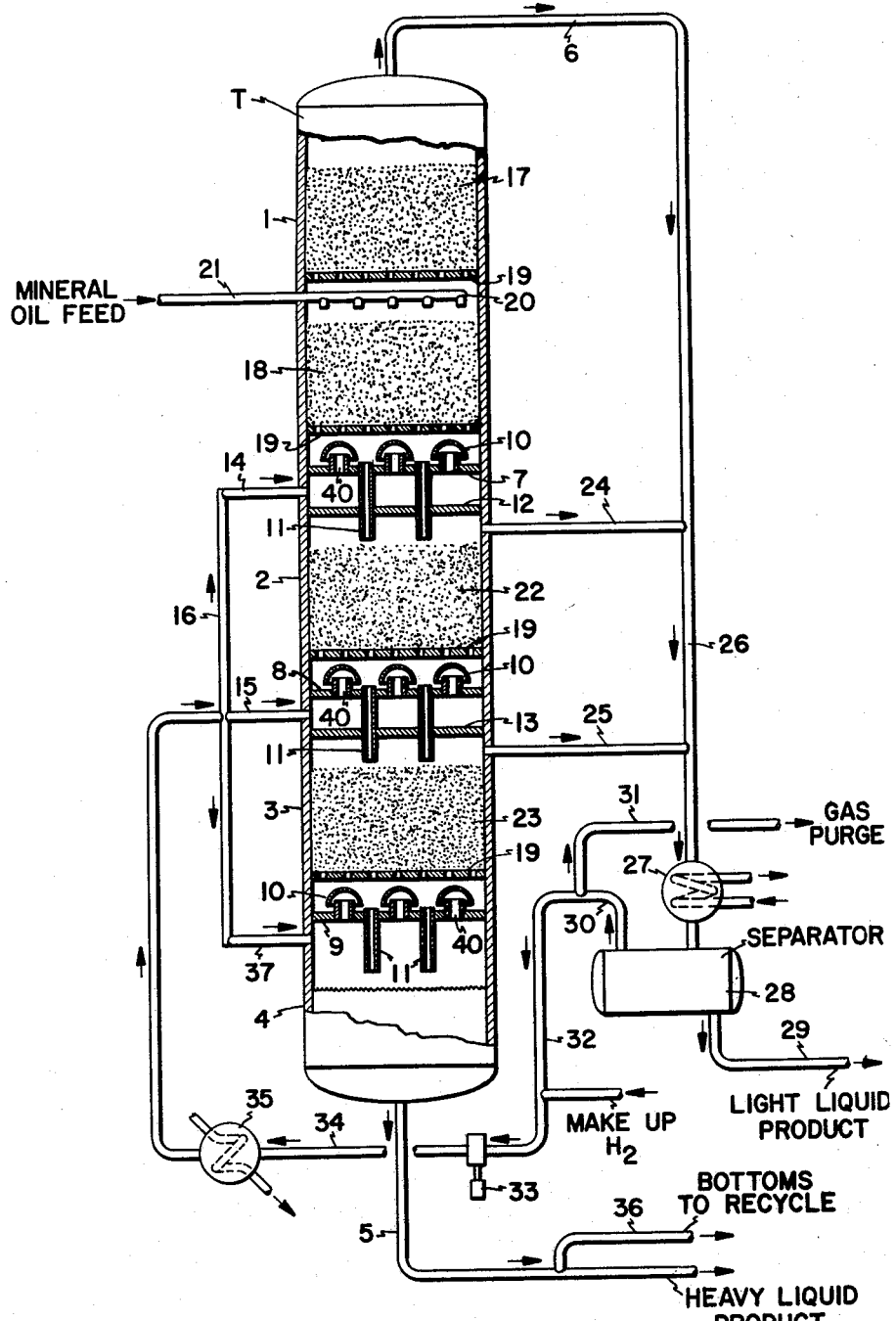
George F. Pappas
Donald D. MacLaren  Inventors
By  Henry Berk  Patent Attorney

3,091,586
HYDROFINING OF SHALE OIL
George F. Pappas, Westfield, and Donald D. MacLaren, Scotch Plains, N.J., assignors to Esso Research and Engineering Company, a corporation of Delaware
Filed Dec. 15, 1959, Ser. No. 859,705
8 Claims. (Cl. 208—210)

This invention relates to a catalytic hydrogenation of high boiling shale oil and other crude mineral oils for removal of their nitrogen and sulfur-containing contaminants under conditions of severity sufficient for decomposition of such contaminants.

More particularly, this invention is concerned with a process for carrying out the catalytic hydrogenation by a process which makes the heavy liquid portion of the feed oil pass through a series of catalyst bed stages accompanied by withdrawal of vapor products as they formed in the successive stages.

A crude mineral oil, like raw shale oil, must be treated as by catalytic hydrogenation to remove the mentioned contaminants before it is suitable as a feed for other refining operations. The nitrogen compounds are even more difficult to remove than the sulfur compounds and have to be subjected to high hydrogenation severity.

Nitrogen compounds are present in the raw oils in two forms: (1) acidic nitrogen compounds having nitrogen external to carbon ring structures, and (2) basic nitrogen compounds having nitrogen inside carbon ring structures. The acidic compounds occur predominantly in the lighter oil fractions and are more readily removed than the basic compounds which are concentrated in the heavy ends. On account of this variation, efforts have been made to treat various parts of the oils separately. However, in giving the heavy ends a more severe hydrogenation treatment, a problem has been found to arise in the tendency of their hydrocarbon components to undergo excessive cracking decomposition, which detrimentally results in lower liquid product yields, higher gas formation, higher hydrogen consumption, and more formation of coke which deactivates the catalyst.

To ameliorate the detrimental results which have arisen in treating the mineral oils and particularly their heavy ends, the present invention provides a method shortening the residence period or catalyst contact time of vaporized products of the treatment as they are formed.

In the preferred embodiment of the invention the heavy ends of a mineral oil are made to flow downwardly through a number of stacked hydrogenation catalyst beds in a tower constructed to permit withdrawal of vapor products from between the beds. By so doing, the contact periods of the vapor products are shortened. At the same time the remaining heavy liquid oil is given a sufficiently long treatment with more concentrated hydrogen-containing treat gas in the gaseous phase. Since the vaporized portions are easily denitrogenated and desulfurized, they receive sufficient treatment if sufficient catalyst is provided in each bed. The liquid passes from a bed in one stage on to the next lower bed stage, as illustrated in the accompanying drawing.

The invention as applied to a heavy mineral oil, such as a raw shale oil, will be described with reference to the flow diagram in the drawing.

The tower T shown in the drawing is composed of four stacked sections 1, 2, 3, and 4, the bottom section containing a bottoms accumulating zone, the upper sections containing beds of catalyst and means for directing flow of gases, vapors, and liquids. Heavy liquid bottoms product is withdrawn by line 5. Overhead light vapors and gases are withdrawn from the top of the tower by line 6.

Between adjacent sections 1—2, 2—3, and 3—4 are mounted bubble cap plates 7, 8, and 9 similar to the kind of plates used in a fractional distillation tower, each of said plates having bubble caps 10 permitting upflow of gas and distribution of the gas into liquid resting on the plates and having liquid downflow pipes 11 for making said liquid pass down into a subadjacent section.

Under the bubble cap plates 7 and 8 are plates 12 and 13 which close off $H_2$ treat gas receiving compartments from which this gas flows up through the upper bubble-cap plates. Gases and vapors are prevented from entering these $H_2$ gas compartments from the subadjacent sections because the plates 12 and 13 have a tight fitting around the liquid downflow pipes 11 and to the interior wall of the tower so as to seal off flow of gas into or from said gas compartments with respect to an underlying gas space. The gas compartments receive $H_2$ treat gas from lines 14 and 15 which connect to the header gas feed line 16.

In the top section 1 are located two catalyst beds, the upper vapor phase treating bed 17 and the lower mixed phase treating bed 18, each resting on a fritted or punched plate 19 permeable to liquids that flow downwardly and to gases and to vapors that flow upwardly. The oil feed is sprayed onto the top of bed 18 through orifices in a perforated distributor 20 from feed line 21. Vapors evolved from this oil feed which has been preheated are made to flow with treat gas up through bed 17 and the resulting treated vapors are taken overhead by line 6.

Modifications may be made to have the vapor phase treating bed in a separate vessel wherein the gas-vapor mixture could be passed in any desired manner, e.g., upflow, downflow, or crossflow.

In sections 2 and 3 are located catalyst beds 22 and 23 on their respective supports 19, permeable to gas vapor, and liquid. In these beds 22 and 23 the liquid oil flows downwardly countercurrently to gas and vapor. The gas and vapor flowing to above each of these beds is withdrawn through side stream lines 24 and 25.

The gases and vapors from overhead line 6 and said side stream lines 24 and 25 are brought together in line 26 to be passed through a heat exchanger-cooler 27 to a high pressure gas separating drum 28. Condensed liquid product is drawn from separator 28 by line 29 to a unit (not shown) where further separation and fractionation of components is accomplished, e.g., to remove dissolved gases, separate a naphtha product and a higher boiling fraction, e.g., kerosene and diesel fuel.

Gas is removed from separator 28 by line 30. A portion or all of the gas thus removed is purged through line 31. A portion of this gas, which contains unreacted $H_2$, may be recycled by line 32, compressor 33, line 34, and through heat exchanger 35 for heating to the gas supply line header 16.

The bottom section 4 of tower T receives heavy liquid product that flows down from plate 9. This heavy liquid is withdrawn as bottoms through line 5. A portion of this liquid may be diverted through line 36 as a recycle for further treatment.

Treat gas from line 16 is passed by line 37 into the bottom section 4 to rise up through the bubble caps 10 of plate 9 into the section 3. Various conventional hydrofining catalysts may be used in the process, e.g., 5–15 wt. percent molybdena on porous alumina, and mixtures of cobalt oxide (3–6 wt. percent) with molybdenum oxide (6–12 wt. percent) on adsorptive alumina, or other sulfur-resistant hydrogenation catalysts. A preferred catalyst is represented by the cobalt and molybdenum oxides in the form of cobalt molybdate, $CoMoO_4$, on adsorptive alumina. The catalyst is generally in the form of pellets or granules $\frac{1}{16}$ to $\frac{1}{4}$ inch in diameter.

The hydrogen-containing treat gas used may contain fresh $H_2$ with recycled gas. The gas may contain gaseous hydrocarbons and be derived from other refinery sources, e.g., catalytic reforming. The treat gas rate varies with needs for the feed treated and generally is in the range of 1,000 to 12,000 standard cubic feet per barrel of feed oil.

The conditions of hydrofining come within broad ranges, e.g., 100 to 3000 p.s.i.g. pressure, 750° to 950° F., and space velocities of 0.1 to 10+ volumes (liquid feed) per volume of catalyst per hour. However, the preferred overall conditions are 800° to 850° F., 400 to 1000 p.s.i.g., and space velocities of 0.2 to 2 v./v./hr. (volume of liquid/volume of catalyst per hour).

A preferred method of operation is described in the following example.

*Example*

The $CoMoO_4$-$Al_2O_3$ catalyst used is arranged in four beds within a tower, as described, so that the final liquid product has to flow downwardly through three of the beds in countercurrent direction to the treat ($H_2$) gas.

A fresh raw shale oil feed boiling in the approximate range of 350° to 875° F.+ (90% from 450° to 875° F.) preheated to 800° F. is introduced between a vapor phase treating zone catalyst bed and the first mixed phase treating bed to be contacted by liquid oil, treat gas entering the bottom of this bed in which the temperatures are 800° to 850° F. and the pressure is 800 p.s.i.g. Vapors flashed from the oil feed and evolved in this first mixed (liquid-vapor) phase catalytic treatment zone together with treat gas passed through this zone are passed through the vapor phase treating zone bed at 750° to 800° F. and 800 p.s.i.g. The amount of vapor thus treated in the vapor phase without liquid present is approximately half the initial oil feed in terms of liquid volume. The amount of catalyst used in the bed wherein substantially all the oil is in vapor phase is approximately one-fourth the entire amount of catalyst used in the tower and is sufficient to decompose the acidic nitrogen compounds predominant in the lighter fractions.

The liquid oil, remaining unvaporized as it flows down through an upper catalyst bed 18, then flows down into a bed 22 beneath. As some cracking occurs under conditions necessary for decomposition of the nitrogen-containing organic compounds in the liquid oil, additional vapor is generated as, for instance, in bed 22 at 800° to 850° F. The vapor thus generated is removed with treat gas passed up through the bed so that the vapor is not subjected again to such cracking conditions. The oil remaining unvaporized after this stage is again similarly treated in a still lower bed, e.g., bed 23, and again vapors generated are removed as a side stream with treat gas used in this bed.

The $H_2$-containing treat gas passed separately into each of the catalyst beds where mixed liquid-vapor phase treatment is conducted is apportioned according to needs. Thus, if the total treat gas into the tower is 5000 s.c.f./b. (standard cubic feet per barrel of oil treated), one-fourth of this amount is passed into each of the lower mixed phase treating beds 22 and 23, while the remaining half is passed into the top mixed phase heating bed 18.

By removal of the vapor products as they are formed in the beds where mixed phase (liquid-vapor) hydrofining occurs, the treat gas being less diluted in the gaseous phase exerts an increase in $H_2$ partial pressure which is beneficial for nitrogen removal and lowered carbon yield. For instance, at a $H_2$ partial pressure of 750 p.s.i. the carbon formed has been found to be 1.5 wt. percent of the oil treated whereas at 320 p.s.i. $H_2$ partial pressure the carbon formed was found to be 2.4 wt. percent at the same treating temperature of 800° F. and the same oil feed rate.

For the operations described the treat gas passed through the riser tubes 40 of the bubble caps 10 is substantially free of vapors generated in the catalyst in a subadjacent section. The treat gas is bubbled with liquid on the bubble-cap plate, thus acting to strip out volatile material which is passed with the treat gas into the bed immediately above. The remaining liquid on the plate overflows into the inlet opening of the downcomer tubes 11 which are at slightly lower level than the upper discharge rim of the risers. This arrangement permits good heat exchange between the entering hot treat gas and the liquid for obtaining uniform temperature control.

The invention described is claimed as follows:

1. In a process for hydrofining raw shale oil which remains partly in liquid phase under hydrofining conditions for decomposing nitrogenous organic components of the oil, the improvement which comprises vaporizing a light part of said oil as its remaining heavier liquid part is passed down through a bed of hydrofining catalyst in a first mixed phase zone under hydrofining conditions with $H_2$ treat gas passed up through said bed, passing vapors and treat gas from said bed to a vapor phase hydrofining zone containing hydrofining catalyst where said vapors are hydrofined free of liquid, flowing said heavier liquid part passed down through said first mentioned bed into a second mixed phase treating zone where said heavier liquid part passes down through a bed of hydrofining catalyst under hydrofining conditions and fresh treat gas passes countercurrently upward, and removing vapors with gas from an upper part of said second mixed phase zone in a manner which keeps them from admixing with the products of the other hydrofining zones.

2. In a process for hydrofining raw shale oil which is partly in vapor phase and partly in liquid phase under hydrofining conditions used for decomposing nitrogen- and sulfur-containing organic components of the oil, the improvement which comprises passing part of the oil which remains in liquid phase serially down through a plurality of hydrofining catalyst beds under the hydrofining conditions, passing $H_2$-containing treat gas in separate parallel streams into and up through each of said beds, and withdrawing from above each bed vapors generated in the bed with unconsumed $H_2$ gas as separate streams and free of vapors generated in the other beds.

3. In the process of claim 2, hydrofining catalyst in said beds being cobalt molybdate on adsorptive alumina, and hydrofining temperature conditions of temperature being in the range of about 800° to 850° F.

4. In a process for hydrofining a raw shale oil which boils in the range of about 350° F. to above 875° F. using hydrofining conditions for decomposing nitrogen-containing components of the oil, which comprises providing a plurality of hydrofining catalyst beds vertically spaced one above another in separately confined zones which intercommunicate in having a flow of liquid oil from below a catalyst bed in an upper zone into a catalyst bed in a subadjacent lower zone while preventing flow of vapor from the subadjacent zone into the upper zone, introducing liquid raw shale oil to be hydrofined into a top zone bed to make said flow of liquid oil, bubbling separate portions of $H_2$ gas into liquid oil collected below a catalyst bed in each of said zones, passing said separate portions of gas and vapor generated in each zone up through a catalyst bed confined in the zone, and separately removing vapor with gas from each of said zones.

5. An apparatus for treating a crude mineral oil with catalyst and hydrogen-containing treat gas under hydrofining conditions, which comprises a tower having a top and side stream gaseous stream drawoff lines and a bottom liquid drawoff line, means for supporting vertically spaced catalyst beds in said tower, means under each of said beds for collecting liquid oil passed down through said beds above a bottom catalyst bed and flowing the collected liquid oil into a bed beneath, means for passing separate stream of the treat gas into the bottom of and up through each of said beds, means for blocking flow of vapor from a lower bed contacted by the liquid oil to an upper bed contacted by the liquid oil, said gaseous stream drawoff lines being spaced vertically in the tower to draw off vapor generated in one bed separate from vapor generated in another of said beds, and said bottom drawoff line being disposed to draw off liquid collected below the bottom bed.

6. An apparatus for treating a mineral oil with catalyst and a treat gas, which comprises a tower having a top and side stream gaseous stream drawoff lines and a bottom liquid drawoff line, means for supporting vertically spaced catalyst beds in said tower, means under each of said beds for collecting liquid oil passed down through said beds above a bottom catalyst bed and flowing the collected liquid oil into a bed beneath, said tower having a liquid-accumulating section at its bottom portion for receiving liquid after it has passed through said beds, means for passing a separate stream of the treat gas into the bottom of and up through each of said beds, means for blocking flow of vapor from a lower bed contacted by the liquid oil to an upper bed contacted by the liquid oil, said gaseous stream drawoff lines being spaced vertically along the tower to draw off vapor generated in one bed separate from vapor generated in another of said beds, and said bottom drawoff line being disposed to draw off liquid collected in said liquid-accumulating zone.

7. An apparatus for treating a mineral oil with catalyst and a treat gas, which comprises a tower having a top and side stream gaseous stream drawoff lines and a bottom liquid drawoff line, means for supporting vertically spaced catalyst beds in said tower, means for introducing oil to be treated into the upper portion of said tower for downward flow therethrough, means under each of said beds for collecting liquid oil passed down through said beds above a bottom catalyst bed and flowing the collected liquid oil into a bed beneath, said tower having a liquid-accumulating section at its bottom portion for receiving liquid after it has passed through said beds, means for passing a separate stream of the treat gas into the bottom of and up through each of said beds, means for blocking flow of vapor from a lower bed contacted by the liquid oil to an upper bed contacted by the liquid oil, said gaseous stream drawoff lines being spaced vertically along the tower to draw off vapor generated in one bed separate from vapor generated in another of said beds, and said bottom drawoff line being disposed to draw off liquid collected in said liquid-accumulating zone.

8. An apparatus according to claim 7 wherein said means for introducing oil is arranged between the top two catalyst beds.

References Cited in the file of this patent
UNITED STATES PATENTS

| | | |
|---|---|---|
| 2,303,118 | Frey | Nov. 24, 1942 |
| 2,332,572 | Hepp et al. | Oct. 26, 1943 |
| 2,587,987 | Franklin | Mar. 4, 1952 |
| 2,671,754 | De Rosset et al. | Mar. 9, 1954 |
| 2,769,754 | Sweetser et al. | Nov. 6, 1956 |
| 2,833,698 | Patton et al. | May 6, 1958 |
| 2,878,179 | Hennig | Mar. 17, 1959 |
| 2,952,626 | Kelley et al. | Sept. 13, 1960 |